(12) United States Patent
Shen et al.

(10) Patent No.: US 10,634,796 B2
(45) Date of Patent: Apr. 28, 2020

(54) HIGH-PRECISION REAL-TIME SATELLITE POSITIONING APPARATUS AND METHOD THEREOF

(71) Applicant: BROADGNSS TECHNOLOGIES CO., LTD., Shenzhen (CN)

(72) Inventors: Yan Shen, Tianjin (CN); Yuanbo Li, Luoyang (CN)

(73) Assignee: BROADGNSS TECHNOLOGIES CO., LTD., Shenzhen (CN)

( * ) Notice: Subject to any disclaimer, the term of this patent is extended or adjusted under 35 U.S.C. 154(b) by 441 days.

(21) Appl. No.: 15/665,461

(22) Filed: Aug. 1, 2017

(65) Prior Publication Data
US 2017/0343679 A1 Nov. 30, 2017

Related U.S. Application Data

(63) Continuation of application No. PCT/CN2016/109101, filed on Dec. 9, 2016.

(30) Foreign Application Priority Data

Jan. 29, 2016 (CN) .......................... 2016 1 0064456

(51) Int. Cl.
*G01S 19/40* (2010.01)
*G01S 19/42* (2010.01)
(Continued)

(52) U.S. Cl.
CPC .............. *G01S 19/40* (2013.01); *G01S 19/36* (2013.01); *G01S 19/41* (2013.01); *G01S 19/426* (2013.01)

(58) Field of Classification Search
CPC ........ G01S 19/40; G01S 19/41; G01S 19/426; G01S 19/13; G01S 19/35–37
See application file for complete search history.

(56) References Cited

U.S. PATENT DOCUMENTS

| | | | |
|---|---|---|---|
| 8,120,527 B2 | 2/2012 | Ashjaee et al. | |
| 2002/0016881 A1* | 2/2002 | Hatsumoto | G01S 19/14 710/305 |

(Continued)

FOREIGN PATENT DOCUMENTS

| | | |
|---|---|---|
| CN | 102830405 A | 12/2012 |
| CN | 103364056 A | 10/2013 |

(Continued)

OTHER PUBLICATIONS

Supplemental European Search Report issued in corresponding European Application No. 16 887 742.1, dated Aug. 9, 2019, 8 pages.

(Continued)

*Primary Examiner* — Cassi J Galt
(74) *Attorney, Agent, or Firm* — Bayes PLLC (57) ABSTRACT

The present invention relates to a high-precision real-time satellite positioning apparatus and a method thereof. The present invention has technical features as follows: the apparatus includes a polygonal receiver array formed by a plurality of single-point satellite positioning receivers; an antenna phase center of each single point satellite positioning receiver is disposed at each vertex and center point of the polygonal receiver array; each single-point satellite positioning receiver includes an MCU and a receiver connected with the MCU; and all MCUs are connected in parallel and jointly connected to a processor module.

12 Claims, 4 Drawing Sheets

(51) Int. Cl.
     *G01S 19/36*      (2010.01)
     *G01S 19/41*      (2010.01)

(56) References Cited

U.S. PATENT DOCUMENTS

| | | | |
|---|---|---|---|
| 2003/0107514 A1* | 6/2003 | Syrjarinne | G01S 5/0205 |
| | | | 342/357.74 |
| 2009/0195475 A1 | 8/2009 | Ashjaee et al. | |
| 2016/0033648 A1* | 2/2016 | Overbeck | G01S 19/07 |
| | | | 342/357.25 |
| 2018/0239028 A1* | 8/2018 | Ibendorf | G01S 19/426 |

FOREIGN PATENT DOCUMENTS

| | | |
|---|---|---|
| CN | 105589087 A | 5/2016 |
| CN | 105699939 A | 6/2016 |
| CN | 205374753 U | 7/2016 |

OTHER PUBLICATIONS

International Search Report issued in corresponding International Application No. PCT/CN2016/109101, Publication No. WO 2017/128871 A1, dated Aug. 3, 2017, 16 pages.

* cited by examiner

HIGH-PRECISION REAL-TIME SATELLITE POSITIONING APPARATUS AND METHOD THEREOF

CROSS-REFERENCE TO RELATED APPLICATIONS

This application is a continuation of International Patent Application No. PCT/CN2016/109101 with a filing date of Dec. 9, 2016, designating the United States, now pending, and further claims priority to Chinese Patent Application No. 201610064456.3 with a filing date of Jan. 29, 2016. The content of the aforementioned applications, including any intervening amendments thereto, are incorporated herein by reference.

TECHNICAL FIELD

The present invention belongs to the technical field of satellite navigation and positioning, and in particular relates to a high-precision real-time satellite positioning apparatus and method thereof not depending on a reference station.

BACKGROUND OF THE PRESENT INVENTION

A satellite positioning and navigation system mainly comprises GPS, Beidou, GLONASS, Galileo and the like. With the rapid development of satellite positioning technologies, the demand of people for the rapid and high-precision position information is daily increased. At present, an application range of the high-precision real-time satellite positioning and navigation is wider and wider, and the positioning precision of a user receiver is required to reach a millimeter scale and even a centimeter scale.

A single-point satellite positioning receiver technology has already been very mature. It can be known from a known principle that the satellite positioning is realized by utilizing an observed quantity and a user clock difference such as a pseudo-range of a group of satellites, satellite ephemeris, satellite launching time and the like. At least four satellites must be measured to obtain a three-dimensional coordinate on the ground. In this positioning process, three parts of errors exist: a first part of errors is caused by a satellite clock error, an ephemeris error, an ionosphere error, a troposphere error and the like; a second part of errors is an error caused by propagation delay; and a third part of errors is an intrinsic error of various user receivers and caused such reasons as internal noise, channel delay, multi-path effect and the like. Due to the existence of the errors, the precision of the single-point satellite static positioning is difficult to be less than 10 m, so a high-precision positioning requirement cannot be met.

In order to acquire higher positioning precision, a differential satellite positioning technology is mainly adopted. The principle of the differential satellite positioning technology is as follows: a differential satellite of a known precise three-dimensional coordinate is first used to position a ground reference station and to obtain a pseudo-range correction, a position correction or a carrier phase correction, the correction is then transmitted to the user receiver (a mobile station) in real time by virtue of a data link to correct measurement data of the user receiver, and a majority of errors are eliminated, thereby improving the satellite positioning precision of the user receiver. The user receiver can be in a stationary state, and can also be in a moving state. An information mode transmitted by the reference station can classify the differential positioning into three types, i.e., position differential, pseudo-range differential and phase differential. The differential satellite positioning is to add a (differential) correction signal on the basis of normal satellite positioning, and the correction signal improves the satellite positioning precision. Working principles of the three types of differential modes are identical, and the three types of differential modes are different in specific contents of transmitted corrections and differential positioning precision. In order to further improve the performance and application convenience, a plurality of reference stations can be connected into a network through a data processing center, thereby forming a ground enhancement system for transmitting the correction to the user receiver. We find that a principle of the existing differential satellite positioning technology can remarkably improve the positioning precision only by transmitting the correction through the data link by means of the reference station. However, the cost for building and using the reference station, the data link and the user receiver is very high, and the operation is complex; and furthermore, the biggest problem in the application is that the effective action distance and range of the reference station correction data is limited. The defects prevent the wide-scale use and popularization of the high-precision real-time satellite positioning and navigation.

SUMMARY OF PRESENT INVENTION

The present invention aims at overcoming the defects of the prior art, and providing a high-precision real-time satellite positioning apparatus which is reasonable in design, high in precision and low in cost, and a method thereof.

Technical problems of the present invention are solved by adopting the following technical solution:

A high-precision real-time satellite positioning apparatus comprises a polygonal receiver array formed by a plurality of single-point satellite positioning receivers; an antenna phase center of each single-point satellite positioning receiver is disposed at each vertex and center point of the polygonal receiver array; each single-point satellite positioning receiver comprises a microcontroller (MCU) and a receiver connected with the MCU; and all MCUs are connected in parallel and jointly connected to a processor module.

Further, antenna oscillators of the single-point satellite positioning receivers are distributed on a same plane; each single-point satellite positioning receiver antenna is corrected to enable a direction of a deviation vector between a coordinate observed value and a real value of the single-point satellite positioning receiver disposed at each vertex to be consistent; and the direction of the deviation vector is opposite to the direction of the deviation vector of the single-point satellite positioning receiver disposed at the center point, i.e., the direction difference of the two deviation vectors is 180 degrees.

Further, the polygonal receiver antenna array is an equilateral triangular receiver antenna array, a square receiver antenna array, an equilateral pentagonal receiver antenna array or an equilateral hexagonal receiver antenna array.

A high-precision real-time satellite positioning method comprises the following steps:

step 1, all the single-point satellite positioning receivers send respective IDs and observed value coordinates to a processor module;

step 2, the processor module calculates the following two geometric figures according to the ID of each single-point satellite positioning receiver, an observed value of each single-point satellite positioning receiver, and a physical geometric parameter of the polygonal receiver array: one figure is a geometric figure formed by encircling the coordinate observed values of various vertex receivers; and the other one is a geometric figure formed by encircling physical circuits of the vertex receivers with the coordinate observed value of the receiver disposed at the center point as a center point;

step 3, if the two geometric figures have an overlapped area, the observed value obtained from the receiver disposed at the center point and the coordinate observed value obtained from the receiver at each vertex are used to calculate a coordinate of the polygonal center point and to perform the differential calculation, thereby obtaining a coordinate of a middle point between the two coordinates; and the coordinate is high-precision latitude and longitude coordinate information of a geometric center point of the antenna array; and step 4, if the two geometric figures have no overlapped area, the positioning coordinate is corrected by utilizing a corrected value to obtain high-precision latitude and longitude coordinate information of the geometric center point of the antenna array.

Further, the corrected value is obtained through a corrected value function library; the corrected value function library comprises an optimum corrected value corresponding to different parameter conditions such as carrier-to-noise ratios, a number of available satellites, elevation angles, angles, a practical number of channels and the like, and the optimum corrected value is acquired through a test mode.

Further, a length of the corrected value is smaller than a radius of the physical receiver antenna array.

Further, the method for using the corrected value to correct the positioning coordinate is as follows: the coordinate of the polygonal center point calculated by utilizing the coordinate observed value of the single-point satellite positioning receiver at each vertex subtracts the corrected value, thereby obtaining the high-precision latitude and longitude coordinate information of the geometric center point of the antenna array.

The present invention has advantages and positive effects as follows:

1. In the present invention, a plurality of single-point satellite positioning receivers are arranged according to a certain geometric shape to form a receiver array circuit, so that three portions of errors of the single-point satellite positioning receiver can be maximally eliminated, and the positioning precision (reaching a millimeter scale and even a centimeter scale) can be remarkably improved by directly utilizing and processing a satellite positioning signal issued by the satellite positioning system.

2. The present invention improves the positioning precision without depending on the reference station, thereby completely saving the construction and application cost of the reference station, a ground enhancement system and a data link, also omitting the complicated professional technical operation, and further enabling an operating range to have no limitation.

3. Compared with a user receiver performing the communication and differential calculation based on the reference station, the cost of the receiver is very low.

4. Compared with an ordinary single-point satellite positioning receiver, although the number of partial elements is increased, the elements are elements with low cost, and the satellite positioning precision is increased by 100 times, so that the cost performance of the user receiver is remarkably improved.

5. The present invention is reasonable in design, has the characteristics of high precision, low cost, convenience in use and the like, and can be widely used and popularized in the field of ordinary civil use of the high-precision real-time satellite positioning and navigation.

DETAILED DESCRIPTION OF PREFERRED EMBODIMENTS

Embodiments of the present invention are further described below in detail in combination with the drawings.

A high-precision real-time satellite positioning apparatus improves the positioning precision by using a receiver array circuit formed by arranging a plurality of single-point satellite positioning receivers according to a certain geometric shape; the receiver array may be distributed in a triangular shape, a square shape, a pentagonal shape, a hexagonal shape or other polygonal geometric shapes; and an antenna phase center of each single-point satellite positioning receiver is disposed at each vertex and center point of a polygon.

Figure 1:
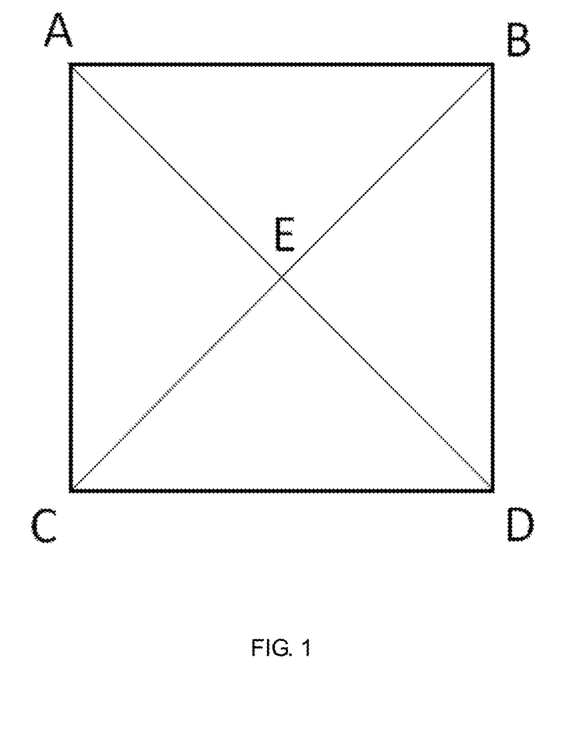
FIG. 1 is a geometric distribution diagram of a square receiver antenna array of the present invention.

Description is made below by taking a high-precision real-time satellite positioning apparatus formed by a square receiver array as shown in FIG. 1 as an example. The high-precision real-time satellite positioning apparatus formed by the square receiver array comprises a main receiver circuit of a square array consisting of five single-point satellite positioning receivers; geometric phase centers of the antennas of four single-point satellite positioning receivers are disposed at four vertexes A, B, C and D of the square, and the geometric phase center of the antenna of the other center single-point satellite positioning receiver is disposed at the center point E. Various receiver antenna oscillators are distributed on a same plane. The antennas of the receivers at the four vertexes A, B, C and D are corrected, so that directions of deviation vectors between coordinate observed values and real values of the four receivers are same. The antenna of the receiver disposed at the center point E is corrected, so that the direction of the deviation vector between the coordinate observed value and the real value is 180 degrees different from the direction of the deviation vectors of the receivers A, B, C and D, i.e., the deviation directions are opposite.

Figure 2:
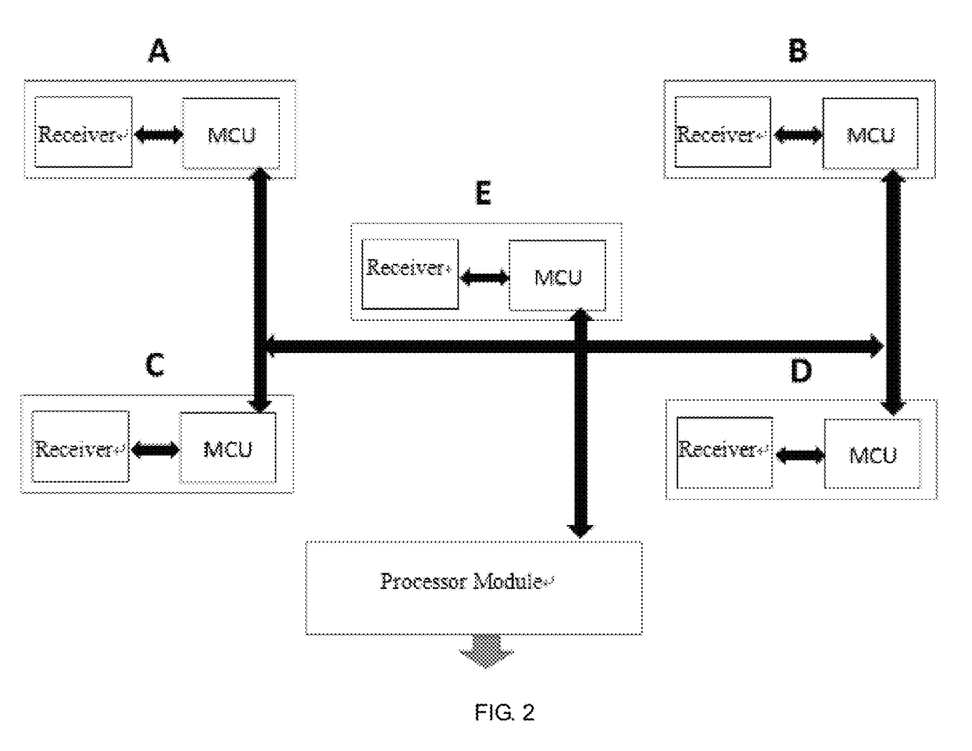
FIG. 2 is a circuit block diagram of a square receiver array.

FIG. 2 illustrates a circuit block diagram of a high-precision real-time satellite positioning apparatus. Each single-point satellite positioning receiver comprises an MCU and a receiver connected with the MCU; and the MCUs of the five single satellite positioning receivers are connected in parallel and jointly connected into a processor. Each of the single-point satellite positioning receivers A, B, C, D and E analyzes the satellite signal intensity, a satellite elevation angle and an angle as well as the number of available satellites, so as to enable the five receivers to lock same available positioning satellites. The original satellite positioning data is received at a speed of N frames per second to be processed independently, so that a geometric phase center coordinate of each single-point receiver is calculated. Each receiver utilizes a corresponding MCU to process the received data; and the five MCUs generate IDs of the five receivers. The five MCUs are connected in parallel, so that the five receivers can keep the data synchronous, and can send the ID data of each receiver to the processor module. A first effect of the processor module is to control the five receivers and MCUs to be synchronous in data; and a second effect of the processor module is to parse the data received by the MCU, comprehensively process the data so as to complete the calculation, and calculate and output a final positioning coordinate.

A high-precision real-time satellite positioning apparatus formed by an equilateral triangular array, an equilateral pentagonal array, an equilateral hexagonal array or other equilateral polygonal arrays is similar to the high-precision real-time satellite positioning apparatus formed by the square array and is not repeated herein.

A working principle of the high-precision real-time satellite positioning apparatus of the present invention is as follows: since the antenna phase center of each single-point satellite positioning receiver is disposed at each vertex and center point of the polygon, vectors (distance and direction) of a relative position among the antenna phase centers of the receivers are constant and are know parameters. On the other hand, each receiver can obtain a satellite positioning coordinate observed quantity; and due to an error of the single-point receiver, a deviation exists between the observed value and a real coordinate of the antenna phase center of each receiver. The vector of the relative position among the coordinate observed values of the receiver antenna phase centers is compared with the known vectors of the relative position among the antenna phase centers of the receivers, so that a deviation vector caused by various foregoing errors can be extracted. Then, the observed value of an overall phase center of the receiver array antenna can subtract the deviation vector, thereby obtaining an observed coordinate of an overall circuit of the receiver array. Since the deviation can be eliminated, the coordinate is closer to the real coordinate.

The high-precision real-time satellite positioning apparatus of the present invention can completely eliminate a first part of errors of the single-point satellite positioning receivers and can eliminate a majority of a second part and a third part of errors. In order to realize the best application effect, the following requirements shall be met.

Firstly, the single-point positioning precision of each single-point receiver shall be improved as far as possible.

Secondly, the receiver antenna array shall be arranged in the equilateral polygonal shape such as the equilateral triangle, square, pentagon or hexagon. Each receiver antenna phase center is disposed at each vertex and center point.

Thirdly, clocks of all receivers are kept synchronous, and an independent receiver MCU is used for synchronizing the clocks.

Fourthly, each single-point satellite positioning receiver antenna is corrected to enable the direction of a deviation vector between a coordinate observed value and a real value of the single-point satellite positioning receiver disposed each vertex to be consistent; and the direction of the deviation vector is opposite to the direction of the deviation vector of the single-point satellite positioning receiver disposed at the center point, i.e., the direction difference of the two vectors is 180 degrees. The positioning precision is optimized by adjusting the dimension.

Fifthly, all receivers receive the data from a same satellite. The original data of a satellite positioning signal is received at a speed of N frames per second to be processed independently.

Sixthly, the precision is improved through the corrected value. Different parameters influencing the precision such as the carrier-to-noise ratio, the number of the available satellites, the elevation angle, the angle, the practical quantity of the channels and the like are used to obtain the optimum corrected value. The length of the corrected value shall be smaller than the radius of the receiver circuit.

Based on the above high-precision real-time satellite positioning apparatus, and taking a square receiver array as an example, a high-precision real-time satellite positioning method comprises the following steps.

Step 1, the single-point satellite positioning receivers send respective IDs and observed value coordinates to a processor module.

Step 2, the processor module calculates a geometric figure according to an ID of each receiver, an observed value of an apex receiver, an observed value coordinate of the center receiver, and a physical geometric parameter of the square array.

Since the direction of the coordinate deviation vector of the receivers disposed at the four vertexes is 180 degrees different from the direction of the coordinate deviation vector of the receiver disposed at the center point, i.e., the deviation directions are opposite, then two squares are calculated: one square is a square ABCD formed by encircling the coordinate observed value obtained by the receivers at four vertexes, and the center point coordinate is E; and the other one is a square A'B'C'D' drawn by adopting the observed value E' of the receiver disposed at the center point in the physical circuit and the physical length of the receiver antenna square array.

Figure 3:
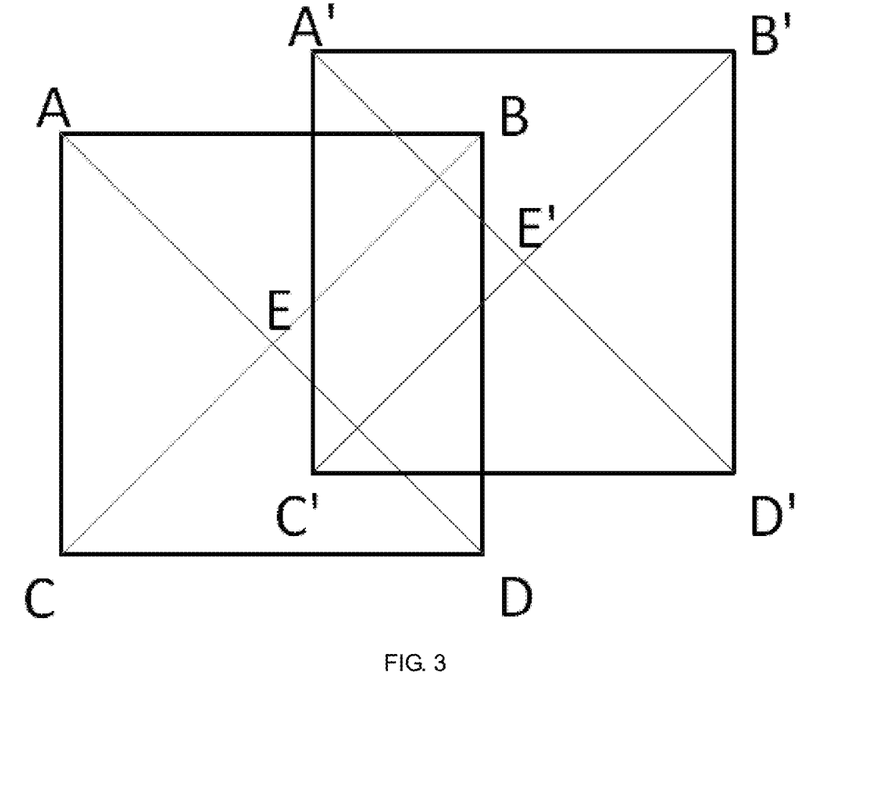
FIG. 3 is a working principle diagram of a square receiver array of the present invention (two squares are overlapped)

Step 3, if the ABCD and the A'B'C'D' have an overlapped area (as shown in FIG. 3), the observed value E' obtained from the receiver disposed at the center point and the coordinate observed value obtained by the receivers at four vertexes are used to calculate a coordinate E of the square center point so as to perform the differential calculation, i.e., calculate the coordinate of a middle point between the two coordinates, thereby obtaining the high-precision coordinate information of the geometric center point of the antenna array. If the geometric dimension of the antenna array is dozens of centimeters, an error of the obtained coordinate information is within dozens of centimeters.

Figure 4:
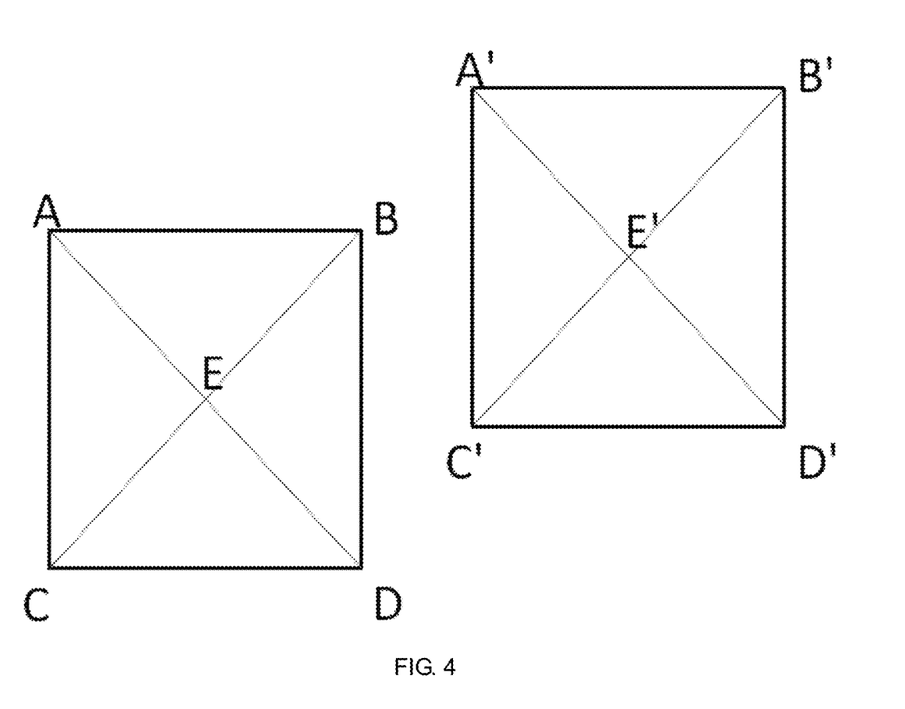
FIG. 4 is a working principle diagram of a square receiver array of the present invention (two squares are not overlapped).

Step 4, if the ABCD and the A'B'C'D' have no overlapped area (as shown in FIG. 4), it indicates that the deviation is great, and the positioning precision is not high. Under this condition, the precision can be improved by introducing the corrected value.

Since different conditions such as the carrier-to-noise ratio, the number of available satellites, the elevation angle, the angle, the practical quantity of channels and the like can influence the positioning precision, the optimum corrected value can be obtained under different parameter conditions such as the carrier-to-noise ratio, the number of the available satellites, the elevation angle, the angle, the practical number of the channels and the like through a test, thereby forming a corrected value function database. A length of the corrected value is smaller than a radius of the physical receiver antenna array. In practical operation, the receiver will call the optimum corrected value from the database according to different carrier-to-noise ratios, different numbers of available satellites, different elevation angles, different angles and different practical quantities of the channels from this database. The coordinate E of the square center point calculated by utilizing coordinate observed value obtained by the receivers at the four vertexes subtracts the corrected value, thereby obtaining the high-precision latitude and longitude coordinate information of the geometric center point of the antenna array.

A high-precision real-time satellite positioning method formed by an equilateral triangular array, an equilateral pentagonal array, an equilateral hexagonal array or other equilateral polygonal arrays is similar to the high-precision real-time satellite positioning method formed by the square array and is not repeated herein.

It is to be understood that embodiments described in the present invention are illustrative and not restrictive, so the present invention is not limited to the embodiments described in the specific embodiments. Any other embodiments obtained by those skilled in the art according to the technical solution of the present invention such as the receiver array of other geometric shapes shall also be within the protection scope of the present invention.

We claim:

1. A satellite positioning apparatus, comprising:
   a polygonal receiver array formed by a plurality of single-point satellite positioning receivers, wherein an antenna phase center of a respective single-point satellite positioning receiver is disposed at vertices of the polygonal receiver array and at a geometric center point of the polygonal receiver array, wherein each single-point satellite positioning receiver comprises a microcontroller and a receiver connected with the microcontroller; and
   a processor module, wherein the microcontrollers are connected in parallel and jointly connected to the processor module,
   wherein the single-point satellite positioning receivers are configured to send respective identifiers (IDs) and observed coordinate values to the processor module,
   wherein the processor module is configured to calculate the following two geometric figures according to the ID of each single-point satellite positioning receiver, an observed coordinate value of each single-point satellite positioning receiver, and a physical geometric parameter of the polygonal receiver array: one figure is a geometric figure formed by encircling the observed coordinate values of the vertex receivers and having a first center point calculated by utilizing a observed coordinate value of the single-point satellite positioning receiver at the vertices, and the other figure is a geometric figure formed by adopting the observed coordinate value of the receiver disposed at the geometric center point as a second center point and forming vertices of the geometric figure based on the physical geometric parameter of the polygonal receiver array,
   wherein the processor module is further configured to, if the two geometric figures have an overlapped area, use the observed coordinate value obtained from the receiver disposed at the geometric center point and the observed coordinate value obtained from the receiver at the vertices to perform the differential calculation between the first center point and the second center point, thereby obtaining a coordinate of a middle point between the first center point and the second center point; and the coordinate of the middle point is latitude and longitude coordinate information of the geometric center point of the antenna array; and
   wherein the processor module is additionally configured to, if the two geometric figures have no overlapped area, correct the first center point by utilizing a correction value to obtain latitude and longitude coordinate information of the geometric center point of the antenna array.

2. The apparatus according to claim 1, wherein the single-point satellite positioning receivers comprise antenna oscillators, wherein the antenna oscillators of the single-point satellite positioning receivers are distributed on a same plane as one another.

3. The apparatus according to claim 1, wherein the polygonal receiver antenna array is an equilateral triangular receiver array, a square receiver array, an equilateral pentagonal receiver array or an equilateral hexagonal receiver array.

4. A positioning method of a satellite positioning apparatus comprising a polygonal receiver array formed by a plurality of single-point satellite positioning receivers, wherein an antenna phase center of a respective single-point satellite positioning receiver is disposed at vertices of the polygonal receiver array and at a geometric center point of the polygonal receiver array, each single-point satellite positioning receiver comprises a microcontroller and a receiver connected with the microcontroller, and the microcontrollers are connected in parallel and jointly connected to a processor module, the method comprising:
   sending, by the single-point satellite positioning receivers, respective identifiers (IDs) and observed coordinate values to the processor module;
   calculating, by the processor module, the following two geometric figures according to the ID of each single-point satellite positioning receiver, an observed coordinate value of each single-point satellite positioning receiver, and a physical geometric parameter of the polygonal receiver array: one figure is a geometric figure formed by encircling the observed coordinate values of the vertex receivers and having a first center point calculated by utilizing a observed coordinate value of the single-point satellite positioning receiver at the vertices; and the other figure is a geometric figure formed by adopting the observed coordinate value of the receiver disposed at the geometric center point as a second center point and forming vertices of the geometric figure based on the physical geometric parameter of the polygonal receiver array;
   if the two geometric figures have an overlapped area, using, by the processor module, the observed coordinate value obtained from the receiver disposed at the geometric center point and the observed coordinate value obtained from the receiver at the vertices to perform the differential calculation between the first center point and the second center point, thereby obtaining a coordinate of a middle point between the first center point and the second center point; and the coordinate of the middle point is latitude and longitude coordinate information of the geometric center point of the antenna array; and
   if the two geometric figures have no overlapped area, correcting, by the processor module, the first center point by utilizing a correction value to obtain latitude and longitude coordinate information of the geometric center point of the antenna array.

5. The positioning method of claim 4, wherein the correction value is obtained through a correction value function library; and the correction value function library comprises correction values corresponding to different parameter conditions.

6. The positioning method of claim 4, wherein a length of the correction is smaller than a radius of the polygonal receiver antenna array.

7. The positioning method of claim 4, wherein the method for using the correction value to correct the first center point is as follows:

subtracting, by the processor module, the correction value from the first center point calculated by utilizing the observed coordinate value of the single-point satellite positioning receiver at the vertices, thereby obtaining the high-precision latitude and longitude coordinate information of the geometric center point of the antenna array.

8. The positioning method of claim 5, wherein the different parameter conditions comprise carrier-to-noise ratios, a number of available satellites, elevation angles, angles, a practical number of channels, or a combination thereof.

9. The apparatus according to claim 1, further comprising:
a correction value function library, wherein the correction value is obtained by the processor module through the correction value function library, and wherein the correction value function library comprises correction values corresponding to different parameter conditions.

10. The apparatus according to claim 9, wherein the different parameter conditions comprise carrier-to-noise ratios, a number of available satellites, elevation angles, angles, a practical number of channels, or a combination thereof.

11. The apparatus according to claim 1, wherein a length of the correction value is smaller than a radius of the physical receiver antenna array.

12. The apparatus according to claim 1, wherein the processor module is configured to use the correction value to correct the first center point as follows:

the processor module is configured to subtract the correction value from the first center point calculated by utilizing the observed coordinate value of the single-point satellite positioning receiver at the vertices, thereby obtaining the high-precision latitude and longitude coordinate information of the geometric center point of the antenna array.

* * * * *